(12) United States Patent
Mitchell (10) Patent No.: US 10,197,444 B1
(45) Date of Patent: Feb. 5, 2019

(54) COMBINED TEMPORAL/HYPERSPECTRAL IMAGER

(71) Applicant: Wavefront Research, Inc., Bethlehem, PA (US)

(72) Inventor: Thomas A. Mitchell, Nazareth, PA (US)

(73) Assignee: WAVEFRONT RESEARCH, INC., Northampton, PA (US)

( * ) Notice: Subject to any disclaimer, the term of this patent is extended or adjusted under 35 U.S.C. 154(b) by 0 days.

(21) Appl. No.: 15/894,219

(22) Filed: Feb. 12, 2018

Related U.S. Application Data (63) Continuation-in-part of application No. 14/216,058, filed on Mar. 17, 2014, now Pat. No. 9,891,107.

(60) Provisional application No. 61/793,978, filed on Mar. 15, 2013.

(51) Int. Cl.
*G01J 3/28* (2006.01)
*G01J 3/02* (2006.01)
*G01J 3/04* (2006.01)
*G01J 3/18* (2006.01)

(52) U.S. Cl.
CPC ........... *G01J 3/2823* (2013.01); *G01J 3/0208* (2013.01); *G01J 3/04* (2013.01); *G01J 3/18* (2013.01); *G01J 2003/1861* (2013.01)

(58) Field of Classification Search
CPC ........ G01J 3/02; G01J 3/04; G01J 3/28; G01J 3/10; G01J 3/14; G01J 3/18; G01J 3/36; G02B 5/18; G02B 27/30
See application file for complete search history.

(56) References Cited

U.S. PATENT DOCUMENTS

2004/0156048 A1 * 8/2004 Mitchell ................... G01J 3/02
356/305

* cited by examiner

*Primary Examiner* — Abdullahi Nur
(74) *Attorney, Agent, or Firm* — Burns & Levinson LLP; Orlando Lopez (57) ABSTRACT

The present disclosure provides an optical imaging system that defines an optical path. In an aspect, the optical imaging system includes a first optical sub-system configured to substantially image, at a focus plane, electromagnetic radiation emanating from an object plane, a slit element at the focus plane to extract a line image from the electromagnetic radiation, a second optical sub-system configured to collimate, at a center plane, the electromagnetic radiation from the slit element, a dispersive element at the center plane with variable dispersive properties, a third optical sub-system configured to image the collimated electromagnetic radiation from the center plane to an image plane, and a detecting element at the image plane. In one example, the slit element is mechanically movable into and out of the optical path.

12 Claims, 6 Drawing Sheets

COMBINED TEMPORAL/HYPERSPECTRAL IMAGER

RELATED APPLICATION

This application is a continuation in part of U.S. application Ser. No. 14/216,058, filed on Mar. 17, 2014, which claims priority to U.S. Provisional Application No. 61/793,978, filed on Mar. 15, 2013, all of which are incorporated by reference herein in their entirety and for all purposes.

STATEMENT REGARDING GOVERNMENT SPONSORED RESEARCH

This invention was made with U.S. Government support from the U.S. Army under Contracts W15P7T-07-C-P203 and W15P7T-08-C-P212. The U.S. Government may have certain rights in the invention.

BACKGROUND

These teachings relate generally to imagers and spectrometers. More particularly, these teachings relate to temporal or hyperspectral imagers and spectrometers.

In certain applications, it is often desirable to simultaneously capture temporal two-dimensional imagery of a scene as well as scanning hyperspectral imagery of the same scene. This is typically accomplished through the use of separate imaging and hyperspectral imaging sensors, where the data is later co-registered and merged.

There is a need for optical systems that can provide both two-dimensional temporal imaging and hyperspectral imaging.

It is also often desirable for reasons such as, for example, illumination conditions, spectral or spatial feature sizes of the desired target, or data collection rates, to have the capability to adjust the spatial or spectral resolution of a spectrometer.

SUMMARY

Various embodiments of the present teachings provide an imaging optical system with the capability to readily switch between a temporal two-dimensional spatial imaging mode and a hyperspectral imaging mode.

In one aspect, the present teachings provide an optical imaging system defining an optical path. The optical imaging system comprises a first optical sub-system having at least one optical element, said first optical sub-system being configured to substantially image, at a focus plane, electromagnetic radiation emanating from an object plane; at least one slit element substantially located at said focus plane, the at least one slit element being configured to extract a line image from the electromagnetic radiation; a second optical sub-system having at least one optical element, said second optical sub-system being configured to substantially collimate, at a center plane, the electromagnetic radiation from said at least one slit element; at least one dispersive element substantially located at the center plane, said at least one dispersive element comprises variable dispersive properties; a third optical sub-system having at least one optical element, said third optical sub-system being configured to image the substantially collimated electromagnetic radiation from the center plane to an image plane; and at least one detecting element located substantially at the image plane; wherein said at least one slit element is movable into and out of the optical path.

In one embodiment, said at least one dispersive element comprises a pair of counter-rotating transmission gratings, and said at least one dispersive element is configured to provide substantially zero dispersion.

In one embodiment, said at least one dispersive element is movable into and out of the optical path.

In one embodiment, said at least one detecting element is substantially centered on the optical path of said third optical sub-system.

In another aspect, the present teachings provide an optical imaging method. The method comprises imaging electromagnetic radiation from an object plane to an image plane through a slit element of an optical imaging system defining an optical axis, the slit element being substantially located at a focus plane between the object plane and the image plane; mechanically translating the slit element along a direction perpendicular to the optical axis so as to scan the object plan; and detecting the electromagnetic radiation on the image plane.

In one embodiment, imaging the electromagnetic radiation comprises focusing the electromagnetic radiation from the object plane to the slit element at the focus plane; extracting a line image from the electromagnetic radiation using the slit element at the focus plane; collimating the line image to a dispersive element at a center plane between the focus plane and the image plane; and focusing the collimated line image from the center plane to the image plane.

In one embodiment, imaging the electromagnetic radiation further comprises modifying dispersive properties of the dispersive element, and modifying the dispersive properties comprises rotating a first transmission grating of the dispersive element relative to a second transmission grating of the dispersive element.

In one embodiment, mechanically translating the slit element comprises stepwise moving the slit element along the direction perpendicular to the optical axis.

For a better understanding of the present invention, together with other and further objects thereof, reference is made to the accompanying drawings and detailed description.

DETAILED DESCRIPTION

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

Embodiments of the optical system of these teachings which have the capability to readily switch between a temporal two-dimensional spatial imaging mode and a hyperspectral imaging mode, and also embodiments of the optical system of these teachings including a spectrometer with a compact scanning method are disclosed hereinbelow.

Figure 1A:
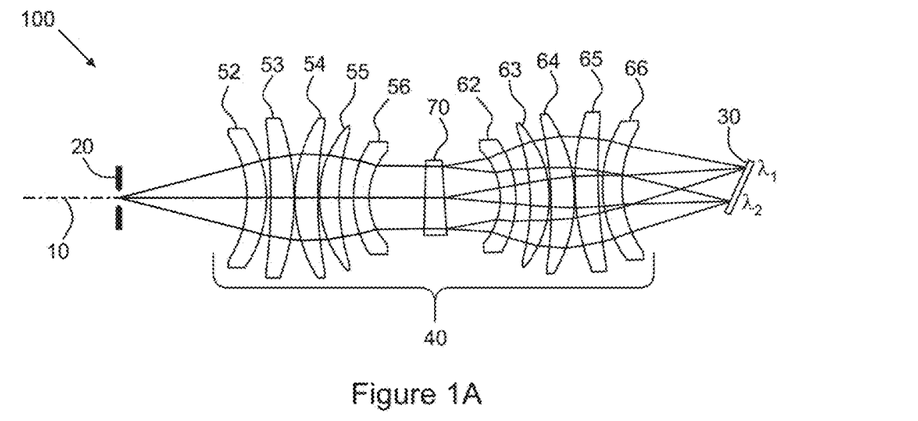
FIGS. 1A-1B are schematic views of previously presented a compact refractive relay spectrometer, taken along its optical axis in the plane parallel to and perpendicular to the direction of dispersion, respectively.

Reference is made to FIG. 1A, which is a schematic view of a refractive relay spectrometer 100 of the type described in U.S. Pat. No. 7,061,611, which is incorporated here by reference in its entirety for all purposes, taken along its optical axis 10 in the plane parallel to the direction of dispersion. In operation, electromagnetic radiation (typically in the ultraviolet, visible, and/or infrared bands, hereinafter referred to generally as light) emitted or reflected by a given object (either real or virtual, hereinafter referred to generally as the source) located at the object plane (e.g., a slit or other method of extracting a line image, hereinafter referred to generally as a slit element 20) is incident on an optical relay imager 40. In this embodiment, optical relay imager 40 comprises refractive elements 52, 53, 54, 55, 56, 62, 63, 64, 65, and 66 and a dispersing element 70. In one embodiment, dispersing element 70 is a transmission diffraction grating. In other embodiment, dispersing element 70 may be any method of angularly separating light energy according to its wavelength, hereinafter referred to generally as a dispersing element. The optical relay imager 40 is capable of substantially receiving a portion of the light emanating from the slit 20 and substantially reimaging the light from the slit 20 and dispersing it according to its wavelength and substantially focusing the light to a focus position (hereinafter also referred to as an image plane 30), which may comprise a CCD array, phosphorescent screen, photographic film, microbolometer array, or other means of detecting light.

Figure 1B:
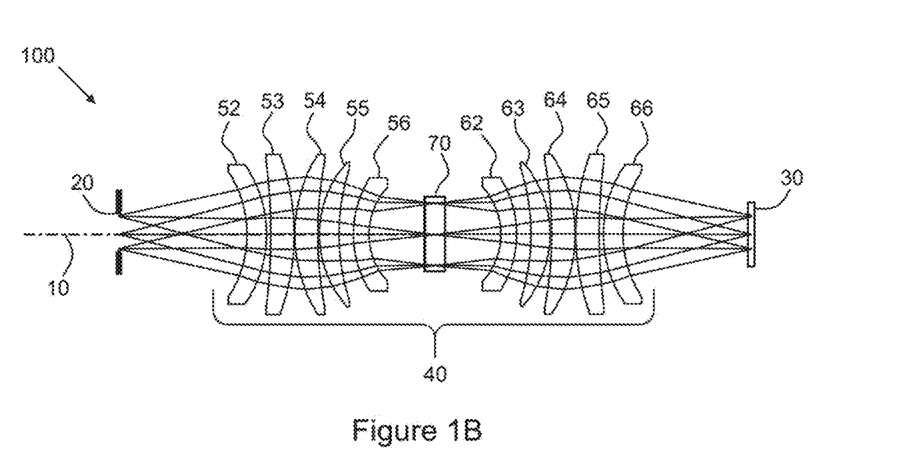

Reference is made to FIG. 1B, which is a schematic view of the refractive relay spectrometer 100 illustrated in FIG. 1A, taken along its optical axis in the plane perpendicular to the direction of dispersion. In operation, light emanating from the slit element 20 is imaged by the optical relay imager 40 onto the image plane 30 with, but not limited to, unity magnification.

In certain cases, it is often desirable to simultaneously capture temporal two-dimensional imagery of a scene as well as scanning hyperspectral imagery of the same scene. The imaging optical systems described herein provide the capability to capture both temporal and hyperspectral imagery with a single sensor. It is also often desirable for reasons such as, but not limited to, illumination conditions, spectral or spatial feature sizes of the desired target, or data collection rates, to have the capability to adjust the spatial or spectral resolution of a spectrometer. Spectrometer designs having the dynamic system resolution of the present teachings can provide this capability.

Figure 2A:
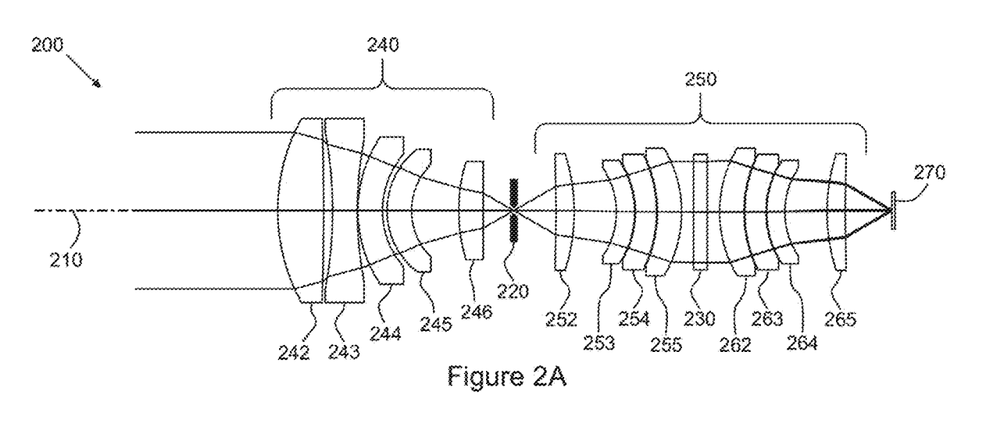
FIGS. 2A-2B are schematic views of an optical imaging system, taken along its optical axis, in accordance with an embodiment of the present disclosure.

FIG. 2A illustrates an optical imaging system 200, taken along its optical axis 210 in the plane parallel to the direction of dispersion, in accordance with an embodiment of the present teachings. The system 200 contains a moveable slit 220 and a variable dispersion dispersing element 230, such as, but not limited to, a pair of transmission gratings, that is capable of changing its combined dispersive properties to be a substantially non-zero value or a substantially zero value. This can be accomplished by, for example, changing the relative orientation of the transmission gratings of dispersing element 230 with respect to one another by rotating one or both gratings such that their dispersions add either constructively or destructively with each other. A rotational mechanism, such as but not limited to, a pair of counter rotating gears, can be used to orient the transmission gratings for the maximum dispersion configuration or the zero dispersion configuration or any dispersion configuration in between. Alternatively, the dispersive element can simply be removed from the optical path to eliminate its dispersion in the optical system.

In the embodiment illustrated in FIG. 2A, the slit 220 remains in the optical path while the variable dispersing element 230 is placed in its dispersing mode, which allows the system to operate in its hyperspectral mode. In operation, light emitted or reflected by a source located at the object plane, is incident on an imager 240. In this embodiment, imager 240 comprises refractive elements 242, 243, 244, 245, and 246, and is capable of substantially receiving a portion of the light from the source and substantially focusing the light onto the slit aperture 220. In this embodiment, slit aperture 220 is capable of substantially receiving the light from the imager 240 and substantially capable of extracting and transmitting a line image.

Light transmitted by the slit element 220 is incident on an optical relay imager 250. In this embodiment, optical relay imager 250 comprises refractive elements 252, 253, 254, 255, 262, 263, 264, and 265, and the variable dispersing element 230. In one embodiment, variable dispersing element 230 may be a pair of rotating transmission diffraction gratings, whose combined dispersive properties are substantially non-zero. The optical relay imager 250 is capable of substantially receiving a portion of the light emanating from the slit 220 and substantially reimaging the light from the slit 220 and dispersing it according to its wavelength and substantially focusing the dispersed light to an image plane 270. By changing the dispersion of the variable dispersion element 230, the spectral resolution of the optical imaging system 200 can be changed such that a decreased dispersion produces a dispersed image with coarser spectral resolution and an increased dispersion produces a dispersed image with a finer spectral resolution.

Figure 2B:
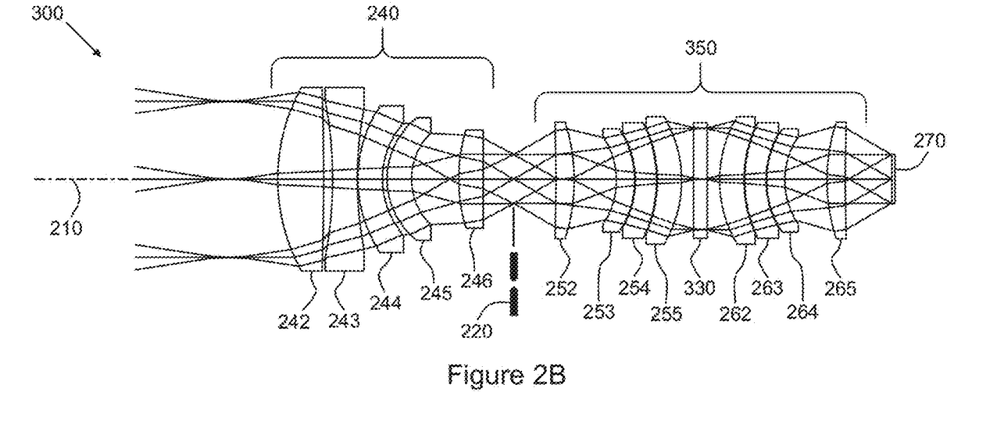

FIG. 2B illustrates an optical imaging system 300, in accordance with an embodiment of the present teachings. In this embodiment, the slit 220 is removed from the optical path and the variable dispersing element 330 is switched to its non-dispersing mode, which allows the system to operate in it temporal two-dimensional spatial imaging mode. With the slit 220 removed and the dispersion of the combined gratings removed, the system 300 behaves as a combined imager and a non-dispersive relay lens. In operation, light emitted or reflected by a source located at the object plane is incident on an imager 240. In this embodiment, imager 240 comprises refractive elements 242, 243, 244, 245, and 246, and is capable of substantially receiving a portion of the light from the source and substantially focusing the light. Light transmitted by the imager 240 is incident on an optical relay imager 350. In this embodiment, optical relay imager 350 comprises refractive elements 252, 253, 254, 255, 262, 263, 264, and 265 and the variable dispersing element 330 comprises a pair of rotating transmission diffraction gratings, whose combined dispersive properties are substantially zero. The optical relay imager 350 is capable of substantially receiving a portion of the light emanating from the imager 240 and substantially reimaging the light from the imager 240 and substantially focusing the light to an image plane 270.

The movement of the slit 220 in optical imaging systems 200 and 300 can be accomplished through any number of means, including but not limited to, a moveable platform, having the platform attached to rails and having a component such as but not limited to a drive motor or screw, that causes the motion of the platform. The movement of the variable dispersing elements 230 and 330 of the optical imaging systems 200 and 300 respectively can be accomplished through any number of means, including but not limited to, a moveable platform, having the platform attached to rails and having a component such as but not limited to a drive motor or screw, that causes the motion of the platform.

In certain cases, it is often desirable for reasons of, for example, size constraints, scanning restrictions, etc., to maintain the sensor in a stationary position while scanning the object or scene.

Figure 3A:
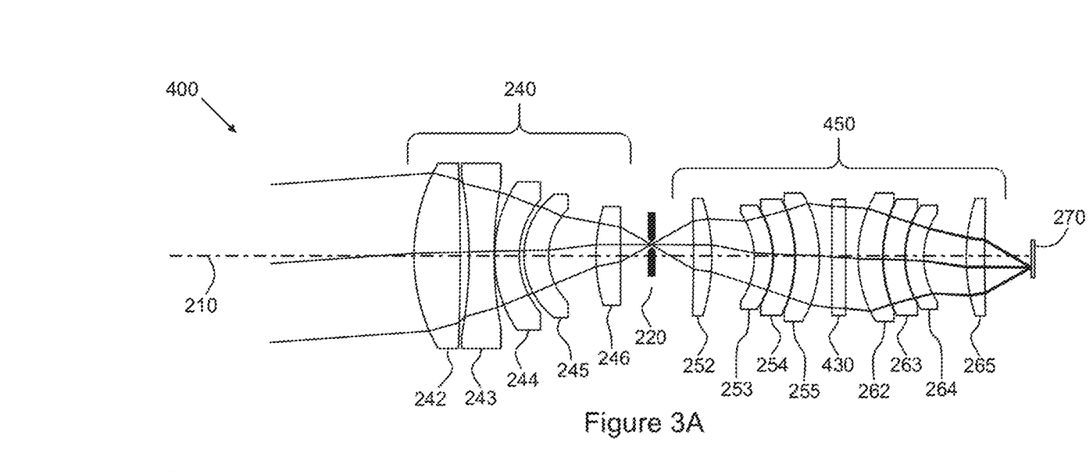
FIGS. 3A-3B are schematic views of an optical imaging system, taken along its optical axis, in accordance with another embodiment of the present disclosure
Figure 3B:
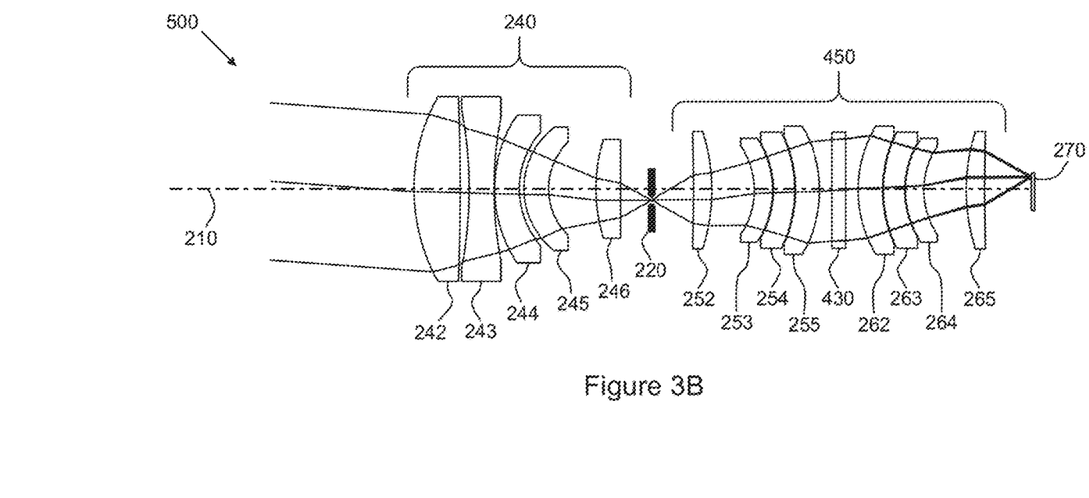

FIGS. 3A and 3B illustrate optical imaging systems 400 and 500 in accordance with another embodiment of the present teachings. In this embodiment, a novel scanning method is provided where the position of the slit 220 is translated in the plane parallel to the direction of dispersion, taken along the optical axis 210 in the plane parallel to the direction of dispersion. As the slit 220 is translated, the sampling field from the imager 240 is scanned across the object or field, while the image on the detector 270 is shifted, allowing the collection of the scene by moving the slit up and down in predetermined steps.

In one embodiment, the portion of the object scene that is imaged by the sensor is dependent upon the position of the slit aperture 220, and by scanning the slit 220 from substantially above to substantially below the optical axis 210, the scene can be readily scanned without introducing any substantially large scanning components. The resulting dispersed image also scans up and down on the detector 270 and the resulting spectral data can be readily reconstructed in post processing.

Referring to FIG. 3A, the slit 220 of optical imaging system 400 is translated in a plane parallel to the direction of dispersion to a position substantially above the optical axis 210. In operation, light emitted or reflected by a source located at the object plane, is incident on an imager 240. In this embodiment, imager 240 comprises refractive elements 242, 243, 244, 245, and 246, and is capable of substantially receiving a portion of the light from the source and substantially focusing the light onto the slit aperture 220. In this embodiment, slit aperture 220 is capable of substantially receiving the light from the imager 240 and substantially capable of extracting and transmitting a line image.

Light transmitted by the slit element 220 is incident on an optical relay imager 450. In this embodiment, optical relay imager 450 comprises refractive elements 252, 253, 254, 255, 262, 263, 264, and 265 and a dispersing element 430. In one embodiment, dispersing element 430 may be a transmission diffraction grating. The optical relay imager 450 is capable of substantially receiving a portion of the light emanating from the slit 220 and substantially reimaging the light from the slit 220 and dispersing it according to its wavelength and substantially focusing the dispersed light to an image plane 270.

Referring to FIG. 3B, the slit 220 of optical imaging system 500 is translated in a plane parallel to the direction of dispersion to a position substantially below the optical axis 210. In operation, light emitted or reflected by a source located at the object plane, is incident on an imager 240. In this embodiment, imager 240 comprises refractive elements 242, 243, 244, 245, and 246, and is capable of substantially receiving a portion of the light from the source and substantially focusing the light onto the slit aperture 220. In this embodiment, slit aperture 220 is capable of substantially receiving the light from the imager 240 and substantially capable of extracting and transmitting a line image.

Light transmitted by the slit element 220 is incident on an optical relay imager 450. In this embodiment, optical relay imager 450 comprises refractive elements 252, 253, 254, 255, 262, 263, 264, and 265 and a dispersing element 430. In one embodiment, dispersing element 430 comprises a transmission diffraction grating. The optical relay imager 450 is capable of substantially receiving a portion of the light emanating from the slit 220 and substantially reimaging the light from the slit 220 and dispersing it according to its wavelength and substantially focusing the dispersed light to an image plane 270. The scanning of the slit 220 of the optical imaging systems 400 and 500 can be accomplished through any number of means, including but not limited to, a moveable platform, having the platform attached to rails and having a component such as but not limited to a drive motor or screw, that causes the motion of the platform.

Figure 4A:
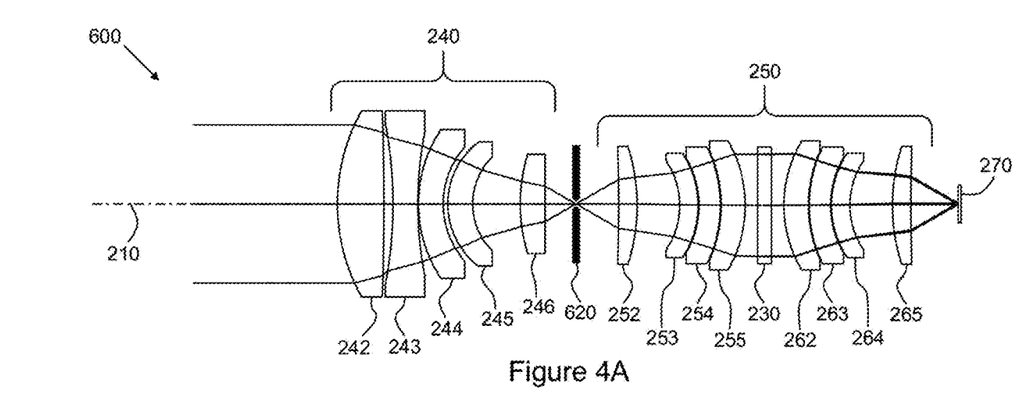
FIGS. 4A-4B are schematic views of an optical imaging system, taken along its optical axis, in accordance with another embodiment of the present disclosure.

FIG. 4A illustrates an optical imaging system 600, taken along its optical axis 210 in the plane parallel to the direction of dispersion, in accordance with an embodiment of the present teachings. The system 600 contains a variable aperture slit 620, such as, but not limited to, a mechanical iris or an electrically addressable liquid crystal window, that is capable of changing its spatial transmission properties to be a substantially narrow sit aperture, hereinafter referred to as its slit aperture mode, or a substantially wider field aperture, hereinafter referred to as its field aperture mode. The system 600 also contains a variable dispersion dispersing element 230, such as, but not limited to, a pair of transmission gratings, that is capable of changing its combined dispersive properties to be a substantially non-zero value, hereinafter referred to generally as its dispersive mode, or a substantially zero value, hereinafter referred to generally as its non-dispersive mode. This can be accomplished by, for example, but not limited to, changing the relative orientation of the transmission gratings of dispersing element 230 with respect to one another by rotating one or both gratings such that their dispersions add either constructively or destructively with each other. A rotational mechanism, such as but not limited to, a pair of counter rotating gears, can be used to orient the transmission gratings for the maximum dispersion configuration or the zero dispersion configuration or any dispersion configuration in between.

In the embodiment illustrated in FIG. 4A, the slit 620 is placed in its slit aperture mode while the variable dispersing element 230 is placed in its dispersing mode, which allows the system to operate in its hyperspectral mode. In operation, light emitted or reflected by a source located at the object plane, is incident on an imager 240. In this embodiment, imager 240 comprises refractive elements 242, 243, 244, 245, and 246, and is capable of substantially receiving a portion of the light from the source and substantially focusing the light onto the slit aperture 620. In this embodiment, slit aperture 620 is capable of substantially receiving the light from the imager 240 and substantially capable of extracting and transmitting a line image.

Light transmitted by the slit aperture 620 is incident on an optical relay imager 250. In this embodiment, optical relay imager 250 comprises refractive elements 252, 253, 254, 255, 262, 263, 264, and 265, and the variable dispersing element 230. In one embodiment, variable dispersing element 230 may be a pair of rotating transmission diffraction gratings, whose combined dispersive properties are substantially non-zero. The optical relay imager 250 is capable of substantially receiving a portion of the light emanating from the slit aperture 620 and substantially reimaging the light from the slit aperture 620 and dispersing it according to its wavelength and substantially focusing the dispersed light to an image plane 270. By changing the dispersion of the variable dispersion element 230, the spectral resolution of the optical imaging system 600 can be changed such that a decreased dispersion produces a dispersed image with coarser spectral resolution and an increased dispersion produces a dispersed image with a finer spectral resolution.

Figure 4B:
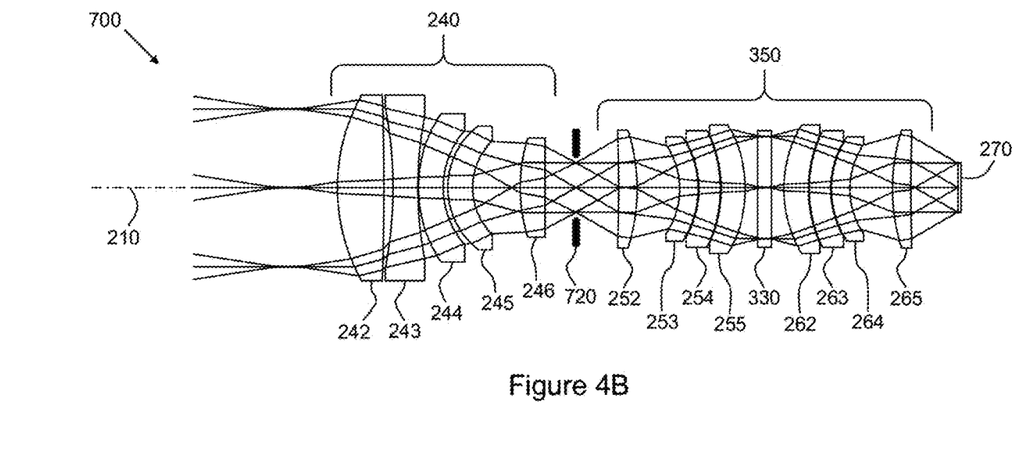

FIG. 4B illustrates an optical imaging system 700, in accordance with an embodiment of the present teachings. In this embodiment, the slit 720 is placed in its field aperture mode, while the variable dispersing element 330 is switched to its non-dispersing mode, which allows the system to operate in its temporal two-dimensional spatial imaging mode. With the slit 720 in its field aperture mode and the dispersion of the combined gratings substantially zero, the system 700 behaves as a combined imager and a non-dispersive relay lens. In operation, light emitted or reflected by a source located at the object plane is incident on an imager 240. In this embodiment, imager 240 comprises refractive elements 242, 243, 244, 245, and 246, and is capable of substantially receiving a portion of the light from the source and substantially focusing the light onto the field aperture 720. Light transmitted by the field aperture 720 is incident on an optical relay imager 350. In this embodiment, optical relay imager 350 comprises refractive elements 252, 253, 254, 255, 262, 263, 264, and 265 and the variable dispersing element 330, which comprises a pair of rotating transmission diffraction gratings, whose combined dispersive properties are substantially zero. The optical relay imager 350 is capable of substantially receiving a portion of the light emanating from the field aperture 720 and substantially reimaging the light from the field aperture 720 and substantially focusing the light to an image plane 270.

Figure 5A:
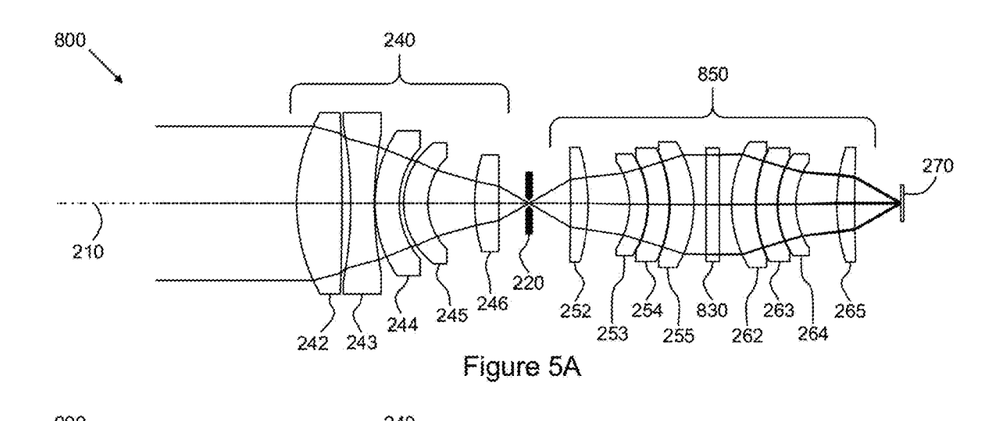
FIGS. 5A-5B are schematic views of an optical imaging system, taken along its optical axis, in accordance with another embodiment of the present disclosure.

FIG. 5A illustrates an optical imaging system 800, taken along its optical axis 210 in the plane parallel to the direction of dispersion, in accordance with an embodiment of the present teachings. The system 800 contains a moveable slit 220 and a moveable dispersing element 830. In the embodiment illustrated in FIG. 5A, the slit 220 and dispersing element 830 remain in the optical path, which allows the system to operate in its hyperspectral mode. In operation, light emitted or reflected by a source located at the object plane, is incident on an imager 240. In this embodiment, imager 240 comprises refractive elements 242, 243, 244, 245, and 246, and is capable of substantially receiving a portion of the light from the source and substantially focusing the light onto the slit aperture 220. In this embodiment, slit aperture 220 is capable of substantially receiving the light from the imager 240 and substantially capable of extracting and transmitting a line image. Light transmitted by the slit element 220 is incident on an optical relay imager 850. In this embodiment, optical relay imager 850 comprises refractive elements 252, 253, 254, 255, 262, 263, 264, and 265, and the moveable dispersing element 830. The optical relay imager 850 is capable of substantially receiving a portion of the light emanating from the slit 220 and substantially reimaging the light from the slit 220 and dispersing it according to its wavelength and substantially focusing the dispersed light to an image plane 270.

Figure 5B:
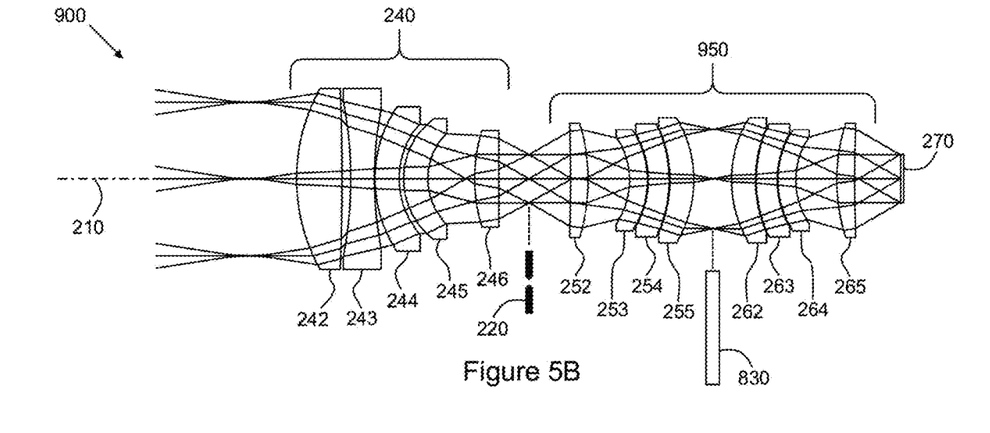

FIG. 5B illustrates an optical imaging system 900, in accordance with an embodiment of the present teachings. In this embodiment, the slit 220 and dispersing element 830 are removed from the optical path, which allows the system to operate in it temporal two-dimensional spatial imaging mode. With the slit 220 and dispersing element 830 removed, the system 900 behaves as a combined imager and a non-dispersive relay lens. In operation, light emitted or reflected by a source located at the object plane is incident on an imager 240. In this embodiment, imager 240 comprises refractive elements 242, 243, 244, 245, and 246, and is capable of substantially receiving a portion of the light from the source and substantially focusing the light. Light transmitted by the imager 240 is incident on an optical relay imager 950. In this embodiment, optical relay imager 950 comprises refractive elements 252, 253, 254, 255, 262, 263, 264, and 265. The optical relay imager 950 is capable of substantially receiving a portion of the light emanating from the imager 240 and substantially reimaging the light from the imager 240 and substantially focusing the light to an image plane 270.

The movement of the slit 220 in optical imaging systems 800 and 900 can be accomplished through any number of means, including but not limited to, a moveable platform, having the platform attached to rails and having a component such as but not limited to a drive motor or screw, that causes the motion of the platform. The movement of the dispersing element 830 of the optical imaging systems 800 and 900 can be accomplished through any number of means, including but not limited to, a moveable platform, having the platform attached to rails and having a component such as but not limited to a drive motor or screw, that causes the motion of the platform.

Figure 6A:
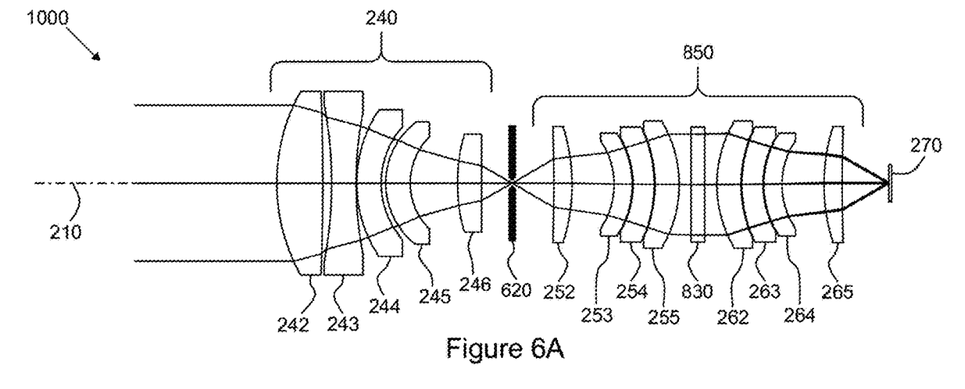
FIGS. 6A-6B are schematic views of an optical imaging system, taken along its optical axis, in accordance with a still further embodiment of the present disclosure.

FIG. 6A illustrates an optical imaging system 1000, taken along its optical axis 210 in the plane parallel to the direction of dispersion, in accordance with an embodiment of the present teachings. The system 1000 contains a variable aperture slit 620, such as, but not limited to, a mechanical iris or an electrically addressable liquid crystal window, that is capable of changing its spatial transmission properties to be a substantially narrow sit aperture, hereinafter referred to as its slit aperture mode, or a substantially wider field aperture, hereinafter referred to as its field aperture mode, and a moveable dispersing element 830.

In the embodiment illustrated in FIG. 6A, the slit 620 is placed in its slit aperture mode while the moveable dispersing element 830 remains in the optical path, which allows the system to operate in its hyperspectral mode. In operation, light emitted or reflected by a source located at the object plane, is incident on an imager 240. In this embodiment, imager 240 comprises refractive elements 242, 243, 244, 245, and 246, and is capable of substantially receiving a portion of the light from the source and substantially focusing the light onto the slit aperture 620. In this embodiment, slit aperture 620 is capable of substantially receiving the light from the imager 240 and substantially capable of extracting and transmitting a line image. Light transmitted by the slit aperture 620 is incident on an optical relay imager 850. In this embodiment, optical relay imager 850 comprises refractive elements 252, 253, 254, 255, 262, 263, 264, and 265, and the moveable dispersing element 830. The optical relay imager 850 is capable of substantially receiving a portion of the light emanating from the slit aperture 620 and substantially reimaging the light from the slit aperture 620 and dispersing it according to its wavelength and substantially focusing the dispersed light to an image plane 270.

Figure 6B:
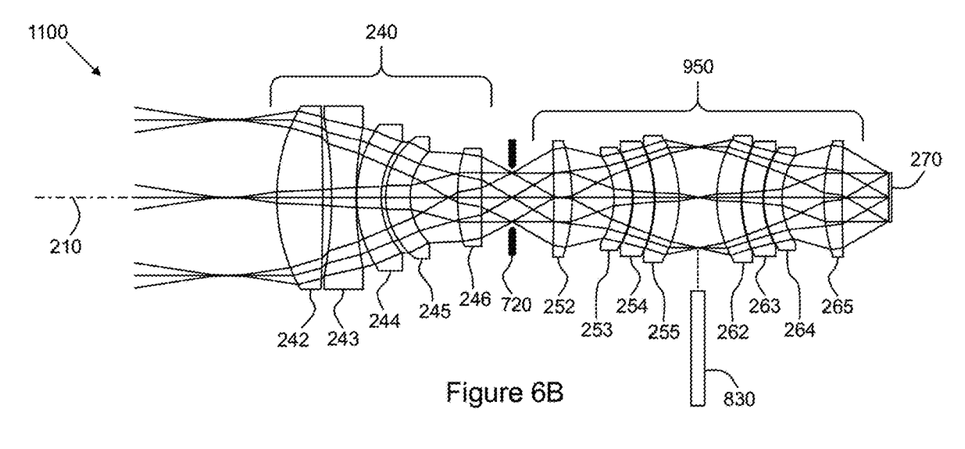

FIG. 6B illustrates an optical imaging system 1100, in accordance with an embodiment of the present teachings. In this embodiment, the slit 720 is placed in its field aperture mode, while the moveable dispersing element 330 is removed from the optical path, which allows the system to operate in its temporal two-dimensional spatial imaging mode. With the slit 720 in its field aperture mode and the dispersing element 830 removed, the system 1100 behaves as a combined imager and a non-dispersive relay lens. In operation, light emitted or reflected by a source located at the object plane is incident on an imager 240. In this embodiment, imager 240 comprises refractive elements 242, 243, 244, 245, and 246, and is capable of substantially receiving a portion of the light from the source and substantially focusing the light onto the field aperture 720. Light transmitted by the field aperture 720 is incident on an optical relay imager 950. In this embodiment, optical relay imager 950 comprises refractive elements 252, 253, 254, 255, 262, 263, 264, and 265. The optical relay imager 950 is capable of substantially receiving a portion of the light emanating from the field aperture 720 and substantially reimaging the light from the field aperture 720 and substantially focusing the light to an image plane 270.

The movement of the dispersing element 830 of the optical imaging systems 1000 and 1100 can be accomplished through any number of means, including but not limited to, a moveable platform, having the platform attached to rails and having a component such as but not limited to a drive motor or screw, that causes the motion of the platform.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present invention, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although these teachings have been described with respect to various embodiments, it should be realized these teachings are also capable of a wide variety of further and other embodiments within the spirit and scope of the invention.

The invention claimed is:

1. An optical imaging system defining an optical path, comprising:
    a first optical sub-system having at least one optical element, said first optical sub-system being configured to substantially image, at a focus plane, electromagnetic radiation emanating from an object plane;
    at least one aperture element substantially located at said focus plane, said at least one aperture element comprising variable aperture properties; wherein said at least one aperture element is configured to extract a substantially two-dimensional spatial image from the electromagnetic radiation in a first configuration and configured to extract a line image in a second configuration;
    a second optical sub-system having at least one optical element, said second optical sub-system being configured to substantially collimate, at a center plane, electromagnetic radiation emanating from said at least one aperture element;
    at least one dispersive element substantially located at the center plane, said at least one dispersive element comprising variable dispersive properties; wherein said at least one dispersive element is configured to provide substantially zero dispersion in a first configuration and configured to provide substantially non-zero dispersion in a second configuration;
    a third optical sub-system having at least one optical element, said third optical sub-system being configured to image electromagnetic radiation emanating from the center plane to an image plane; and
    at least one detecting element located substantially at the image plane;
    wherein said optical imaging system is configured to capture two-dimensional imagery of a scene in a first configuration where said at least one aperture element is configured to extract a substantially two-dimensional spatial image and said at least one dispersive element is configured to provide substantially zero dispersion; and
    wherein said optical imaging system is also configured to capture spectrally dispersed imagery of a scene in a second configuration where said at least one aperture element is configured to extract a line image and said at least one dispersive element is configured to provide substantially non-zero dispersion.

2. The optical imaging system of claim 1, wherein said at least one dispersive element comprises at least one variable dispersive element.

3. The optical imaging system of claim 2, wherein said at least one dispersive element comprises a pair of counter-rotating transmission gratings.

4. The optical imaging system of claim 2, wherein said at least one dispersive element is configured to provide substantially zero dispersion.

5. The optical imaging system of claim 1, wherein said at least one detecting element is substantially centered on the optical path of said third optical sub-system.

6. An optical imaging method, comprising:
    imaging electromagnetic radiation from an object plane to an image plane through an aperture element of an optical imaging system defining an optical axis, the aperture element being substantially located at a focus plane between the object plane and the image plane; wherein imaging the electromagnetic radiation comprises:
    focusing the electromagnetic radiation from the object plane to the aperture element at the focus plane;
    collimating the transmitted electromagnetic radiation from the aperture element to a center plane between the focus plane and the image plane; and
    focusing the collimated electromagnetic radiation from the center plane to the image plane;
    said aperture element being configured to extract a substantially two-dimensional spatial image from the electromagnetic radiation in a first configuration and configured to extract a line image in a second configuration;
    at least one dispersive element being configured to provide substantially zero dispersion in a first configuration and configured to provide substantially non-zero dispersion in a second configuration;

configuring said optical imaging system to capture two-dimensional imagery of a scene in a first configuration where said aperture element is configured to extract a substantially two-dimensional spatial image and said at least one dispersive element is configured to provide substantially zero dispersion;

configuring said optical imaging system to capture hyperspectral imagery of a scene in a second configuration where said aperture element is configured to extract a line image and said at least one dispersive element is configured to provide substantially non-zero dispersion; and detecting electromagnetic radiation emanating from on the image plane.

7. An optical imaging system defining an optical path, comprising:
   a first optical sub-system having at least one optical element, said first optical sub-system being configured to substantially image, at a focus plane, electromagnetic radiation emanating from an object plane;
   at least one slit element substantially located at said focus plane, the at least one slit element being configured to extract a line image from the electromagnetic radiation;
   wherein said at least one slit element is configured to be movable into and out of an optical path;
   a second optical sub-system having at least one optical element, said second optical sub-system being configured to substantially collimate, at a center plane, electromagnetic radiation emanating from said at least one slit element;
   at least one dispersive element substantially located at the center plane; wherein said at least one dispersive element is configured to be movable into and out of the optical path;
   a third optical sub-system having at least one optical element, said third optical sub-system being configured to image electromagnetic radiation emanating from the center plane to an image plane; and
   at least one detecting element located substantially at the image plane;
   wherein said optical imaging system is configured to capture two-dimensional imagery of a scene in a first configuration where said at least one slit element is substantially moved out of the optical path and said at least one dispersive element is substantially moved out of the optical path; and
   wherein said optical imaging system is also configured to capture spectrally dispersed imagery of a scene in a second configuration where said at least one slit element is moved into the optical path and said at least one dispersive element is moved into the optical path.

8. The optical imaging system of claim 7, wherein said at least one detecting element is substantially centered on the optical path of said third optical sub-system.

9. An optical imaging method, comprising:
   imaging electromagnetic radiation from an object plane to an image plane through a slit element of an optical imaging system defining an optical axis, the slit element being substantially located at a focus plane between the object plane and the image plane;
   wherein imaging the electromagnetic radiation comprises:
   focusing the electromagnetic radiation from the object plane to the slit element at the focus plane;
   collimating the transmitted electromagnetic radiation from the slit element to a center plane between the focus plane and the image plane; and
   focusing the collimated electromagnetic radiation from the center plane to the image plane;
   mechanically translating the slit element along a direction perpendicular to the optical axis; and
   mechanically translating at least one dispersive element along a direction perpendicular to the optical axis;
   configuring said optical imaging system to capture two-dimensional imagery of a scene in a first configuration where said slit element is substantially moved out of an optical path and said at least one dispersive element is substantially moved out of the optical path;
   configuring said optical imaging system to capture hyperspectral imagery of a scene in a second configuration where said slit element is substantially moved into the optical path and said at least one dispersive element is substantially moved into the optical path; and
   detecting electromagnetic radiation emanating from on the image plane.

10. An optical imaging system defining an optical path, comprising:
    a first optical sub-system having at least one optical element, said first optical sub-system being configured to substantially image, at a focus plane, electromagnetic radiation emanating from an object plane;
    at least one aperture element substantially located at said focus plane, said at least one aperture element comprising variable aperture properties; wherein said at least one aperture element is configured to extract a substantially two-dimensional spatial image from the electromagnetic radiation in a first configuration and configured to extract a line image in a second configuration;
    a second optical sub-system having at least one optical element, said second optical sub-system being configured to substantially collimate, at a center plane, electromagnetic radiation emanating from said at least one aperture element;
    at least one dispersive element substantially located at the center plane; wherein said at least one dispersive element is configured to be movable into and out of the optical path;
    a third optical sub-system having at least one optical element, said third optical sub-system being configured to image electromagnetic radiation emanating from the center plane to an image plane; and
    at least one detecting element located substantially at the image plane;
    wherein said optical imaging system is configured to capture two-dimensional imagery of a scene in a first configuration where said at least one aperture element is configured to extract a substantially two-dimensional spatial image and said at least one dispersive element is substantially moved out of the optical path; and
    wherein said optical imaging system is also configured to capture spectrally dispersed imagery of a scene in a second configuration where said at least one aperture element is configured to extract a line image and said at least one dispersive element is moved into the optical path.

11. The optical imaging system of claim 10, wherein said at least one detecting element is substantially centered on the optical path of said third optical sub-system.

12. An optical imaging method, comprising:
    imaging electromagnetic radiation from an object plane to an image plane through an aperture element of an optical imaging system defining an optical axis, the aperture element being substantially located at a focus plane between the object plane and the image plane; wherein imaging the electromagnetic radiation comprises:

focusing the electromagnetic radiation from the object plane to the aperture element at the focus plane;

collimating the transmitted electromagnetic radiation from the aperture element to a center plane between the focus plane and the image plane; and focusing the collimated electromagnetic radiation from the center plane to the image plane;

mechanically translating a dispersive element along a direction perpendicular to the optical axis;

said aperture element being configured to extract a substantially two-dimensional spatial image from the electromagnetic radiation in a first configuration and configured to extract a line image in a second configuration;

configuring said optical imaging system to capture two-dimensional imagery of a scene in a first configuration where said aperture element is configured to extract a substantially two-dimensional spatial image and said at least one dispersive element is substantially moved out of an optical path;

configuring said optical imaging system to capture hyperspectral imagery of a scene in a second configuration where said aperture element is configured to extract a line image and said at least one dispersive element is substantially moved into the optical path; and detecting electromagnetic radiation emanating from on the image plane.

* * * * *